3,050,500
PHOTOSTABILIZED POLYOXYMETHYLENES
Laurence Thomas Sherwood, Jr., West Chester, Pa., assignor to E. I. du Pont de Nemours and Company, Wilmington, Del., a corporation of Delaware
No Drawing. Filed May 2, 1960, Ser. No. 25,858
11 Claims. (Cl. 260—45.95)

This invention provides high molecular weight polyoxymethylenes stabilized against photodegradation, and, more particularly, it provides high molecular weight polyoxymethylenes modified with certain ortho-hydroxybenzophenones as photostabilizers.

This is a continuation-in-part application of my copending application Serial No. 645,910, filed March 14, 1957, now abandoned.

High molecular weight polyoxymethylenes, those having a number of average molecular weight of at least 20,000, have sufficiently good physical properties, such as toughness, stiffness, and tensile strength, to be classed as plastics which may be molded, extruded, or spun into various useful articles. Polyoxymethylenes, like most plastics, are susceptible to photodegradation, which, in turn, causes the polymer to have undesirable physical properties.

It is an object of this invention to provide polyoxymethylene compositions stabilized against photodegradation by the presence of certain ortho-hydroxybenzophenones. Other objects will appear in the more detailed explanation of this invention which follows.

The above objects are accomplished by providing a high molecular weight polyoxymethylene having a number average molecular weight of at least 20,000, and containing 0.1% to 5% by weight of an ortho-hydroxybenzophenone having the formula

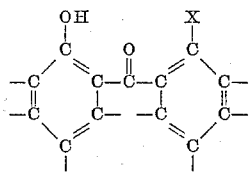

wherein X is selected from the group consisting of hydrogen, hydroxyl, and chlorine, and each of the carbon atoms in the 3-, 4-, 5-, and 6-positions on each ring structure is bonded to a member of the group consisting of hydrogen, alkyl radicals of 1–4 carbon atoms, alkoxyl radicals of 1–4 carbon atoms and chlorine.

Because of the sensitivity of polyoxymethylene resins to acids which initiate degradation, it has been found that the above types of benzophenones are far superior to others as photostabilizers for polyoxymethylenes. For example, if the carbon atom in the 4-position on either or both of the rings of the above formula is connected to a hydroxyl group, the resulting benzophenone imparts too much thermal instability to the polyoxymethylene to be commercially acceptable. Other specific benzophenones may impart a certain amount of color to the polyoxymethylene, which may or may not be undesirable, depending upon the ultimate use to which the polyoxymethylene will be put. One of the best photostabilizers comprehended by the above formula is 2-hydroxy-4-methoxy-4'-chlorobenzophenone, because it causes the least amount of color change and the least amount of reduction in thermal stability in polyoxymethylene resins of any benzophenone tested.

In the following examples the polyoxymethylenes are characterized by various tests which measure their thermal stability and the photostability. The thermal stability of the polymeric compositions of this invention is reported herein as "syringe stability" at 222° C. ($SS_{222}$).

The units of $SS_{222}$ are ml. of gas evolved per gram of polymer per 10 minutes' elapsed time at 222° C. The $SS_{222}$ of a polymeric sample is determined by heating a weighed sample of polymer in a hypodermic syringe at 222° C. and observing the position of the syringe cylinder at 10 and 20 minutes after the beginning of the test. The syringe which is used should be well cleaned and preferably should be about 50 ml. of volume. Polymer, in the form of a pressed pellet or molding powder, is weighed to the nearest 0.001 gram and placed in the syringe, which is lubricated between the piston and the cylinder with a high quality inert grease such as a polysilicone. The syringe is evacuated and filled with nitrogen several times. Silicone oil is drawn into the syringe and ejected until about 5 ml. remains surrounding the polymer pellet serving as a means for expelling all gases prior to the test and as a heat transfer medium during the test. The nozzle of the syringe is then sealed and the syringe is placed in a vapor bath at 222° C. The vapor bath may be vapors of methyl salicylate. The position of the syringe cylinder is noted at 10 minutes and 20 minutes after the syringe is first placed in the vapor bath. If desired, the test may be carried on to 30 minutes or more. The change in the position of the syringe piston over a 10-minute period determines the amount of gas evolved in the test and, thus, the amount of polymer which has degraded to monomer or other gas. Thus, a value of 5.0 for $SS_{222}$ indicates an evolution of 5 ml. of gas per gram of polymer over the period from 10 to 20 minutes after the beginning of the test. If some other interval of time is employed herein, it will be indicated.

The thermal degradation of polyoxymethylenes generally follows that predicted for a first-order reaction. From time to time there may be observed a slight variation from a first-order reaction, but it has been found that for all practical purposes the kinetics of a first-order reaction define this degradation reaction.

The thermal stability of polyoxymethylene has been reported in certain other instances as a reaction rate constant for thermal degradation at 222° C. ($k_{222}$) in units of percent by weight of the polymer which degrades per minute at 222° C. In U.S. Patent 2,768,994 issued to R. N. MacDonald on October 30, 1956, certain polyoxymethylenes are claimed which have a $k_{222}$ of less than 1% by weight per minute. The relationship between $k_{222}$ and $SS_{222}$ may be closely approximated through the following equation:

$k222$ (percent/1 min.)

$$= \frac{\text{(volume of gas in ml. evolved in time } t) \times 0.0736}{\text{(time } t \text{ in minutes)} \times \text{(initial weight of polymer sample in grams)}}$$

The factor 0.0736 is a constant calculated on the assumption that all of the evolved gas is monomeric formaldehyde and that it behaves as an ideal gas. Based on the above equation it may be seen that a comparison of $k_{222}$ and $SS_{222}$ is as follows:

| $k_{222}$ (percent by weight/min.) | $SS_{222}$ (ml. gas/ 10 min./gram of polymer) |
|---|---|
| 1.0 | 136 |
| 0.5 | 68 |
| 0.1 | 14 |
| 0.05 | 7 |
| 0.01 | 1.4 |

Another physical property employed in the characterization of the compositions of this invention is "flow number" (FN). This property is of value in the qualitative determination of the moldability of the composition.

Flow number has also been found to have a definite correlation with the number average molecular weight of the composition. The test is conducted by charging a convenient amount (5 grams is sufficient) of polymer into the cylinder of a melt indexing machine, the cylinder being maintained at 200° C. and being fitted with an extrusion orifice having a diameter of 0.0413 ±0.0002 inch and a length of 0.158 ±0.0001 inch. The piston (weighing 60 grams) is inserted into the cylinder and is loaded with a weight of 5000 grams. At an elapsed time of 5 minutes after the polymer is charged into the cylinder, the extrudate coming out of the orifice is cut off and discarded. At a total elapsed time of 6, 7, 8, 9, and 10 minutes, the extrudate is cut off and weighed to an accuracy of ±1%. The weights of these 5 extrudates are plotted versus time, and the best straight line is drawn through the five plotted points. The intercepts at 5 and at 10 minutes' elapsed time are multiplied by 10 and reported as the "flow number" in grams/10 minutes at 5 minutes' elapsed time and at 10 minutes' elapsed time.

The effectiveness of the tested photostabilizers was tested by subjecting samples of film strips, 4–5 mils (0.004–0.005 inch) in thickness, ½ inch wide, and 4–6 inches long, to various times of exposure to light, and then testing the strip in an MIT folding endurance tester. This MIT tester subjected the film to 1.5 kg. of tensile stress and at the same time folded the film by holding one end steady and bending the other end through an angle of 135° on each side of the neutral position at a rate of 180 cycles per minute. The test is stopped when the film breaks and the results are reported in terms of the number of cycles required to break the film. The exposure was accomplished in a filtered X–W weatherometer as described in ASTM E42–55T, the X–W weatherometer corresponding to the Type E machine in that specification. The MIT folding endurance test is described in ASTM D–643–43. This ASTM specification states that the film undergoing the test should be 0.59 ±0.01 inch wide and 5.5 inches long, and that each reported result should be an average of 10 tested samples. The results shown in the following examples are for a single tested sample which was 0.50 inch wide and 4–6 inches long depending upon whatever length was considered necessary to provide proper area for clamping in the machine.

EXAMPLE 1

A powdery, high molecular weight polyoxymethylene diacetate having a flow number of 2.1, which is comparable to a number average molecular weight of about 50,000, and containing 0.78% by weight of a polyamide as a thermal stabilizer and 0.19% of 4,4'-butylidene bis(3-methyl-6-tertiary-butyl phenol) as an antioxidant, was mixed with crystals of the appropriate photostabilizer and then subjected to the action of differential milling rolls at about 200° C. in order to produce a sheet material containing the amounts of the photostabilizers shown in Table 1. Portions of this sheet were compressed at about 190°–195° C. into films 4–5 mils in thickness and cut into strips ½ inch in width and about 4–6 inches long. These film strips were then subjected to various exposure times in an X–W weatherometer equipped with a Corex–D filter and then subjected to the action of the MIT folding endurance tester. The results of the testing are shown in Table 1.

In a similar series of tests, polyoxymethylene diacetates containing 1% of compounds such as 4,4'-dichlorobenzophenone and 4,4'-dimethoxybenzophenone had poorer ratings in the MIT tester than did the control sample of polyoxymethylene diacetate containing no benzophenone, indicating that those benzophenones having no ortho-hydroxyl substituent caused the polymer to be more sensitive to light rather than causing any stabilization.

*Table 1*

| Amount of stabilizer | Hours of exposure in weatherometer | Cycles before breakage in MIT tester [1] |
|---|---|---|
| None (control sample) | 25 | 38,483 (5) |
|  | 50 | 4,510 (4) |
|  | 100 | 0 (4) |
| 1% 2, 2'-dihydroxy-4, 4'-dimethoxybenzophenone. | 50 | 42,035 (5) |
|  | 100 | 92,983 (5.5) |
|  | 200 | 44,411. (4) |
| 1% 2, 2'-dihydroxy-4-methoxybenzophenone | 50 | 66,520 (4) |
|  | 100 | 62,972 (4) |
|  | 200 | 37,303 (4) |
| 1% 2-hydroxy-4-methoxy-4'-chlorobenzophenone. | 50 | 48,956 (3) |
|  | 100 | 53,683 (3.5) |
|  | 200 | 29,181 (5) |
| 1% 2, 6-dibenzoyl-4-methylphenol | 50 | 60,488 (5) |
|  | 100 | 51,230 (5) |
|  | 200 | 20,435 (4) |
| 1% 2-hydroxy-4-methoxybenzophenone | 50 | 73,219 (4) |
|  | 100 | 34,098 (4) |
|  | 200 | 23,097 (4) |

[1] Number in parentheses represents the thickness in mils of the tested film.

EXAMPLE 2

In order to illustrate the inoperability of certain hydroxybenzophenones, comparison tests were made of the thermal stability of polyoxymethylene compositions containing various types of hydroxybenzophenones. The benzophenones were incorporated into polyoxymethylene diacetates in the manner described in Example 1, and the syringe stability ($SS_{222}$) and flow number (FN) were determined, the results of the determinations being shown in Table 2. These tests show that, among the 2-hydroxybenzophenone derivatives, when either of the phenyl rings is substituted in the 4-position by a hydroxyl, gas evolution, as measured by syringe stability is high, which, in turn, means that the polymer is seriously degraded by the presence of that compound. On the other hand, those derivatives in which the benzophenone has in the 4-position any member of the group consisting of hydrogen, alkyl, alkoxyl, and chlorine do not cause any substantial change in the excellent thermal stability of the polymer.

*Table 2*

| Amount of stabilizer | Flow number (FN) gm./10 min. | | Syringe stability at 222° C. ml./gm. ($SS_{222}$) | | | | |
|---|---|---|---|---|---|---|---|
|  | 5 min. | 10 min. | 0–10 min. | 10–20 min. | 20–30 min. | 30–40 min. | 40–50 min. |
| None (control sample) | 2.1 | 2.2 | 0.25 | 1.25 | 1.0 | 2.25 | 2.5 |
| 1% 2,2'-dihydroxy-4,4'-dimethoxybenzophenone | 1.9 | 1.9 | 2.75 | 4.0 | 4.75 | 6.5 |  |
| 1% 2,2'-dihydroxy-4-methoxybenzophenone | 2.3 | 2.3 | 3.0 | 5.1 | 10.7 |  |  |
| 1% 2-hydroxy-4-methoxy-4'-chlorobenzophenone | 2.8 | 2.8 | 4.5 | 8.0 | 20.0 |  |  |
| None (control sample for following tests) triplicate samples |  |  |  | 2.3 |  |  |  |
|  |  |  |  | 1.8 |  |  |  |
|  |  |  |  | 1.5 |  |  |  |
| 1% 2,4-dihydroxy-4'-methoxybenzophenone |  |  |  | 20.0 |  |  |  |
| 1% 2,4-dihydroxybenzophenone |  |  |  | >40 |  |  |  |

EXAMPLE 3

In order to show the photostabilizing power of 2,2'-dihydroxy-4,4'-dimethoxybenzophenone with respect to natural light, polyoxymethylene diacetate samples containing none, 1%, and 2% by weight of the above benzophenone were prepared and exposed to sunlight in Florida for twelve months. The exposed samples were tested for tensile strength, percentage elongation and Izod impact strength of machine-notched samples at 0, 3, 6, and 12 months' exposure time. The tests of tensile strength and percentage elongation are those described in ASTM D-638-49T and the test of Izod impact strength is described in ASTM D-256-47T. The results of the tests showing a retention of these physical properties by the stabilized samples and a loss of these physical properties by the unstabilized samples are shown in Table 3.

*Table 3*

| Amount of stabilizer | Exposure time, mos. | Tensile strength, p.s.i. | Elongation, percent | Machine-notched Izod impact strength ft.-lb./in. |
|---|---|---|---|---|
| None (control sample) | 0 | 10,300 | 30 | 1.74 |
|  | 3 | 9,030 | 5 | 0.79 |
|  | 6 | 7,800 | 5 | 0.59 |
|  | 12 | 5,190 | 3 | 0.60 |
| 1% 2-2'-dihydroxy-4,4'-dimethoxybenzophenone. | 0 | 9,630 | 15 | 1.84 |
|  | 3 | 9,930 | 20 | 1.63 |
|  | 6 | 9,710 | 17 | 1.86 |
|  | 12 | 9,900 | 10 | 1.77 |
| 2% 2,2'-dihydroxy-4,4'-dimethoxybenzophenone. | 0 | 9,820 | 37 | 1.56 |
|  | 3 | 10,100 | 25 | 1.96 |
|  | 6 | 10,100 | 24 | 1.43 |
|  | 12 | 10,100 | 20 | 1.77 |

The base polymer employed in this invention is polyoxymethylene having a number average molecular weight of at least 20,000. There are several varieties of polyoxymethylenes which are distinguishable by the groups which terminate the polymer chain of recurring (—CH₂—O—) units. For example, there are polyoxymethylene glycols in which the terminating groups are hydroxyls; polyoxymethylene dicarboxylates in which the terminating groups are esters, such as acetate and propionate; and polyoxymethylene diethers in which the terminating groups are alkyl or aryl groups joined to the polymer chain by an ether oxygen. The principal differences between any two of these types of polyoxymethylenes is in thermal stability and hydrolytic stability, polyoxymethylene diether being more stable to hydrolysis and about the same or better in thermal stability than polyoxymethylene dicarboxylate, while the latter is better in both respects than polyoxymethylene glycol. Each of these varieties of polyoxymethylenes is susceptible to photodegradation, and, therefore, each of them is intended to be included within the scope of this invention under the generic term "polyoxymethylene."

Polyoxymethylenes are made by polymerizing formaldehyde in the presence of any of a group of polymerization initiators, e.g. primary and secondary aliphatic amines, quaternary ammonium salts, quaternary phosphonium salts, trihydrocarbon phosphines, organometallic compounds, and metal carbonyls. These processes are described and claimed in U.S. Patent 2,734,889, issued February 14, 1956, to F. C. Starr, Jr.; U.S. Patent 2,768,-994, issued October 30, 1956, to R. N. MacDonald; U.S. Patent 2,828,286, issued March 25, 1958, to R. N. MacDonald; U.S. Patent 2,844,561, issued July 22, 1958, to M. F. Bechtold et al.; U.S. Patent 2,848,437, issued August 19, 1958, to W. P. Langsdorf et al.; U.S. Patent 2,841,570, issued July 1, 1958, to R. N. MacDonald; and in copending patent application Serial No. 785,135, filed January 6, 1959, now Patent No. 2,994,687, by H. H. Goodman et al.

Polyoxymethylene dicarboxylates may be prepared by the processes described and claimed in copending applications Serial No. 681,188, filed August 30, 1957, now Patent No. 2,998,409, by S. Dal Nogare et al., and Serial No. 763,842, filed September 29, 1958, now Patent No. 2,964,500, by S. H. Jenkins et al. Polyoxymethylene diethers may be prepared by the processes described and claimed in copending applications Serial No. 682,325, filed by N. Brown et al. on September 6, 1957, and Serial No. 785,136, filed by N. Brown et al. on January 6, 1959.

The photostabilizers which may be used in this invention are the ortho-hydroxybenzophenones having the general formula:

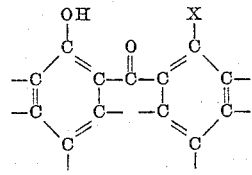

wherein X is selected from the group consisting of hydrogen, hydroxyl, and chlorine, and each of the carbon atoms in the 3-, 4-, 5-, and 6-positions on each ring structure is bonded to a member of the group consisting of hydrogen, alkyl radicals of 1–4 carbon atoms, alkoxyl radicals of 1–4 carbon atoms, and chlorine. Included in the class of compounds having the formula are 2,2'-dihydroxy-4,4'-dimethoxybenzophenone;
2,2'-dihydroxy-4-methoxybenzophenone;
2-hydroxy-4-methoxy-4'-chlorobenzophenone;
2,2'-dihydroxy-4-methoxy-4'-ethoxybenzophenone;
2-hydroxy-4-methoxybenzophenone;
2-hydroxy-4-methoxy-2',4'-dichlorobenzophenone;
2-hydroxy-4,4'-dimethoxybenzophenone;
2-hydroxy-4-methoxy-4'-tertiarybutylbenzophenone;
2-hydroxy-4'-methoxybenzophenone;
2,2'-dihydroxy-4-methyl-4'-propylbenzophenone;
2,2'-dihydroxy-4,4'-diethylbenzophenone;
2,2'-dihydroxy-4,4'-dipropylbenzophenone;
2,2'-dihydroxy-4-butyl-4'-butoxybenzophenone;
2-hydroxy-2'-chloro-4,4'-ditertiarybutylbenzophenone;
2,2'-dihydroxy-4,4',6,6'-tetramethylbenzophenone;
2,2'-dihydroxy-3,3'-ditertiarybutyl-5,5'-dimethoxybenzophenone;
2-hydroxy-4,4'-dichlorobenzophenone;
2-hydroxy-4,4'-6,6'-tetramethoxybenzophenone; and
2-hydroxy-4-methylbenzophenone.

Other combinations of substituent groups falling within the above formula may be imagined by those skilled in the science of chemistry.

Among the above-named benzophenones, 2-hydroxy-4-methoxy-4'-chlorobenzophenone is preferred. This compound has been incorporated into polyoxymethylene resin and extruded or injection molded into various kinds of shaped articles, e.g. piping, hardware, such as knobs, hinges, etc., automotive instrument panels, hose couplings, telephone handset parts, and many other items, all of which showed excellent resistance to photodegradation. Other benzophenones which are highly desirable are the 2,2'-dihydroxybenzophenones of the above formula.

The amount of photostabilizer which may be employed is from 0.1% to 5.0% by weight of the polyoxymethylene. The optimum amount, based upon stabilization effectiveness and upon cost, is from 0.5% to 3.0% by weight of the polyoxymethylene.

The various species of benzophenones of the above formula may impart more or less yellow color to the polyoxymethylene, which, in its unmodified condition, is white. For example, 2,2'-dihydroxy-4,4'-dimethoxybenzophenone imparts slightly more yellowness to polyoxymethylene than does 2-hydroxy-4-methoxybenzophenone, although the former provides slightly better protection against photodegradation than does the latter. It is apparent, therefore, that certain of the benzophenones of this invention may be preferred where the polyoxymethylene must, above all, be white, while other benzophenones may be preferred where yellowness is a minor consideration.

The preferred methods for incorporating the benzophenone into the polyoxymethylene include dry-blending or solution-blending of the benzophenone with the polyoxymethylene, followed by milling, melting, or extruding the blended mixture. Other methods may be apparent to those skilled in this type of technology.

The product composition of this invention finds its principal utility in molded objects which are to be subjected to light of any source. Thus, any polyoxymethylene object which is to be used outdoors would preferably contain one of the ortho-hydroxybenzophenones described above. Such objects, for example, are films, filamentary structures, such as fibers, filaments and bristles, pipes, tubes, rods, sheets, bottles, and various other shaped articles.

I claim:

1. A composition of improved photostability comprising a polyoxymethylene, selected from the class consisting of hydroxyl-free polyoxymethylene carboxylates and hydroxyl-free polyoxymethylene ethers, having a number average molecular weight of at least 20,000 and 0.1% to 5.0% by weight of said polyoxymethylene of a photostabilizer having the formula

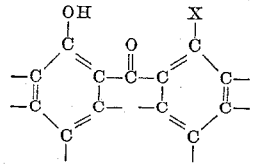

wherein X is selected from the group consisting of hydrogen, hydroxyl, and chlorine, and the carbon atoms in the 3-, 4-, 5-, and 6-positions on each ring structure are each bonded to a member of the group consisting of hydrogen, alkyl radicals of 1–4 carbon atoms, alkoxyl radicals of 1–4 carbon atoms, and chlorine.

2. The composition of claim 1 in which X is hydroxyl, the 4- and 4'-positions are substituted by alkoxyl groups of 1–4 carbon atoms, and the remaining carbon atoms in each ring are bonded to hydrogen.

3. The composition of claim 1 in which the 4-position is substituted by an alkoxyl group of 1–4 carbon atoms, the 4'-position is substituted by chlorine, and the carbon atoms in the 3-, 5-, and 6-positions on each ring are bonded to hydrogen.

4. A composition of improved photostability comprising a polyoxymethylene, selected from the class consisting of hydroxyl-free polyoxymethylene carboxylates and hydroxyl-free polyoxymethylene ethers, having a number average molecular weight of at least 20,000, and 0.5% to 3.0% by weight of 2,2'-dihydroxy-4,4'-dimethoxybenzophenone.

5. A composition of improved photostability comprising a polyoxymethylene, selected from the class consisting of hydroxyl-free polyoxymethylene carboxylates and hydroxyl-free polyoxymethylene ethers, having a number average molecular weight of at least 20,000 and 0.5% to 3.0% by weight of 2-hydroxy-4-methoxy-4'-chlorobenzophenone.

6. A composition of improved photostability comprising a polyoxymethylene, selected from the class consisting of hydroxyl-free polyoxymethylene carboxylates and hydroxyl-free polyoxymethylene ethers, having a number average molecular weight of at least 20,000 and 0.5% to 3.0% by weight of 2,2'-dihydroxy-4-methoxybenzophenone.

7. A composition of improved photostability comprising a polyoxymethylene, selected from the class consisting of hydroxyl-free polyoxymethylene carboxylates and hydroxyl-free polyoxymethylene ethers, having a number average molecular weight of at least 20,000 and 0.5% to 3.0% by weight of 2-hydroxy-4-methoxybenzophenone.

8. A composition of improved photostability comprising a polyoxymethylene, selected from the class consisting of hydroxyl-free polyoxymethylene carboxylates and hydroxyl-free polyoxymethylene ethers, having a number average molecular weight of at least 20,000 and 0.5% to 3.0% by weight of 2,2'-dihydroxy-4-methoxy-4'-ethoxybenzophenone.

9. A film comprising the composition of claim 1.

10. A filamentary structure comprising the composition of claim 1.

11. A shaped article comprising the composition of claim 1.

References Cited in the file of this patent

UNITED STATES PATENTS

| | | |
|---|---|---|
| 2,755,262 | Dilke et al. | July 17, 1956 |
| 2,819,247 | Lundberg | Jan. 7, 1958 |
| 2,871,220 | MacDonald | Jan. 27, 1959 |
| 2,919,259 | Naylor et al. | Dec. 29, 1959 |

FOREIGN PATENTS

| | | |
|---|---|---|
| 748,856 | Great Britain | May 9, 1956 |
| 1,202,250 | France | July 20, 1959 |